United States Patent [19]
Crisio, Jr. et al.

[11] Patent Number: 4,660,479
[45] Date of Patent: Apr. 28, 1987

[54] TREE PLANTING MACHINE

[76] Inventors: Raymond A. Crisio, Jr., 18 S. 13 St., Belleville, Ill. 62220; Jerry R. Black, 753 Memoir La., Manchester, Mo. 63021

[21] Appl. No.: 823,238

[22] Filed: Jan. 28, 1986

[51] Int. Cl.⁴ .............................................. A01C 11/02
[52] U.S. Cl. .......................................... 111/2; 111/89
[58] Field of Search ............... 111/2, 3, 67, 68, 89, 111/90

[56] References Cited

U.S. PATENT DOCUMENTS

| | | |
|---|---|---|
| 156,545 | 11/1874 | Davis ................................. 111/89 |
| 352,186 | 11/1886 | Henderson ......................... 111/89 |
| 577,539 | 2/1897 | Speidel ................................ 111/2 |
| 827,857 | 8/1906 | Fleak .................................. 111/89 |
| 2,514,522 | 7/1950 | Shelton .............................. 111/3 |
| 2,719,498 | 10/1955 | Goolsby ............................. 111/3 |
| 3,097,616 | 7/1963 | Arnold ............................... 111/3 |
| 3,931,774 | 1/1976 | Bradley .............................. 111/3 |
| 4,112,857 | 9/1978 | Bradley .............................. 111/3 |
| 4,156,395 | 5/1979 | Edwards et al. ................... 111/3 |
| 4,294,179 | 10/1981 | Cayton et al. .................... 111/3 |
| 4,364,316 | 12/1982 | Paladino ............................ 111/3 |
| 4,408,550 | 10/1983 | Ellis ..................................... 111/2 |
| 4,438,710 | 3/1984 | Paladino ............................ 111/3 |
| 4,443,151 | 4/1984 | Armstrong et al. ............... 111/3 |

FOREIGN PATENT DOCUMENTS

| | | | |
|---|---|---|---|
| 2334283 | 8/1977 | France ................................ 111/3 |
| 8400961 | 10/1985 | Netherlands ..................... 111/3 |
| 982564 | 12/1982 | U.S.S.R. ............................ 111/3 |

*Primary Examiner*—James R. Feyrer
*Attorney, Agent, or Firm*—Robert K. Rhea

[57] ABSTRACT

A trailer-type apparatus for planting canister contained tree seedlings, or the like, includes a furrow forming plow followed by a backfill blade sequentially operated for forming the furrow and covering the roots of a seedling deposited in the furrow. A belt-type conveyor, provided with transverse recesses, receives canister contained tree seedlings from a supply hopper and deposits the seedlings in sequence on a seedling supporting ramp. A pressure cylinder plunger separates the seedling from its canister and deposits it on a pivoting platform lowering the seedling by gravity into a sleeve chute where it is temporarily supported until a quantity of water, released from an adjacent tank, washes the seedling out of the chute to fall into an underlying furrow prior to backfilling.

6 Claims, 9 Drawing Figures

TREE PLANTING MACHINE

BACKGROUND OF THE INVENTION

1. Field of the Invention

The present invention relates to forestry and more particularly to a tree planting machine.

2. Description of the Prior Art

Planting machines are in general use for reforestation of cut, burned over or otherwise barren forest land. Frequently the planting machine fails to set the plant sufficiently deep and as a result the plant fails to grow well and may die. Many devices have been provided for attempting to sense the depth of earth penetration, such as by the use of a tubular earth penetrating tool for forming an excavation for the plant. However, some of these tubular hole forming tools are arranged to be inserted into the earth in an oblique angle downward movement rendering it difficult to properly position the young plant in an upright direction. Most of the devices used for planting trees require the use of an operator to trigger the release of a plant or a series of plants.

This invention is distinctive over tree planting apparatus of which we are aware by automatically forming a tree plant receiving recess in the surface of the earth, sequentially placing a plant in the recess following its formation, covering the roots of such plant and watering the plant.

SUMMARY OF THE INVENTION

A mobile trailer-like frame is provided with cooperating furrow digging and backfilling implements actuated by forward movement of the frame. The frame carries a reservoir of plants sequentially moved into position and released to fall by gravity into a plant recess formed by a plow blade by a frame actuated reciprocating plunger. Other cam operated means releases a measured quantity of water to fall by gravity with the plant into the earth recess which is followed by a back-filling blade covering the plant roots in the recess.

The principal object of this invention is to provide a machine which automatically excavates a hole in the earth for a tree seedling, deposits and waters the tree seedling, prior to backfilling the earth around the seedling root system.

DESCRIPTION OF THE PREFERRED EMBODIMENTS

Figure 1:
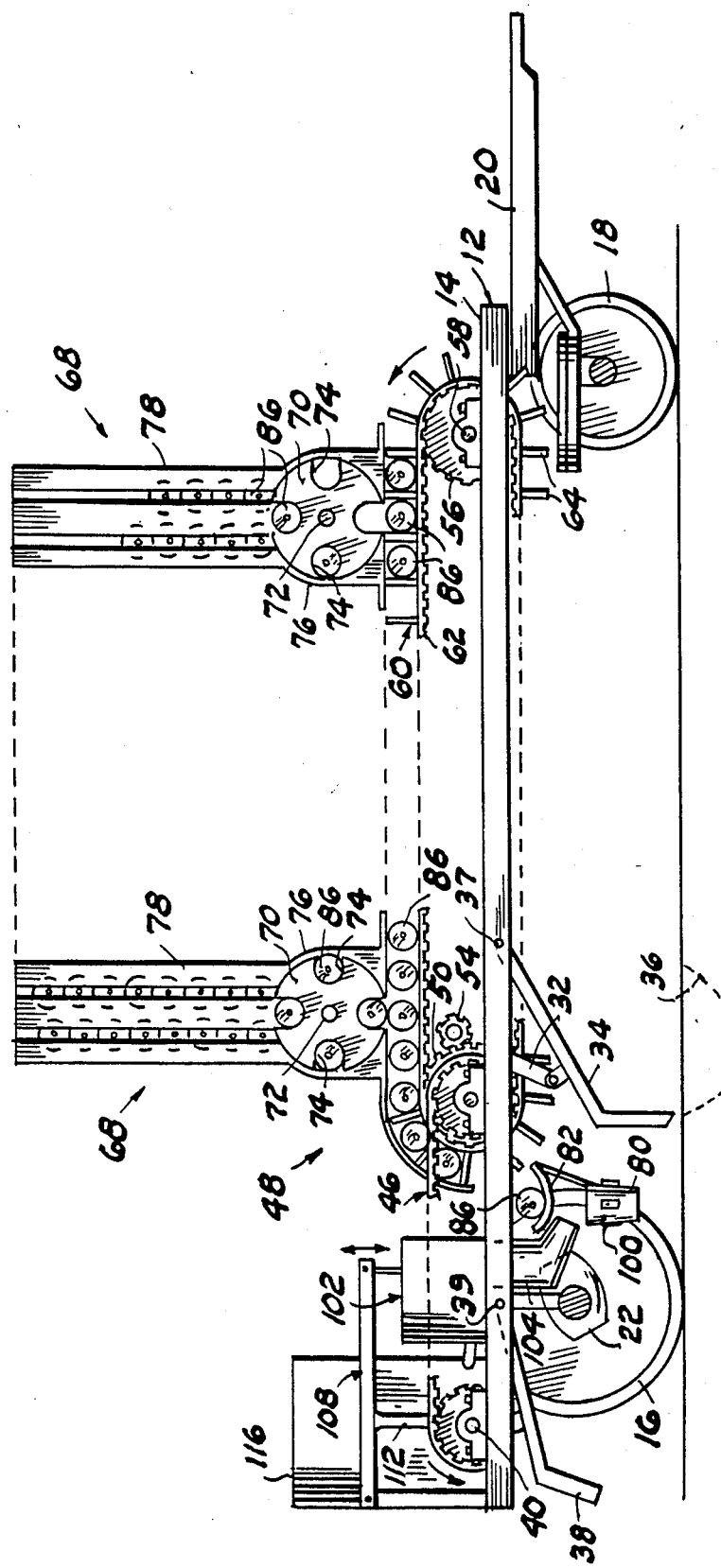
FIG. 1 is a fragmentary side elevational view of a substantially automatic tree planter in operative position.
Figure 2:
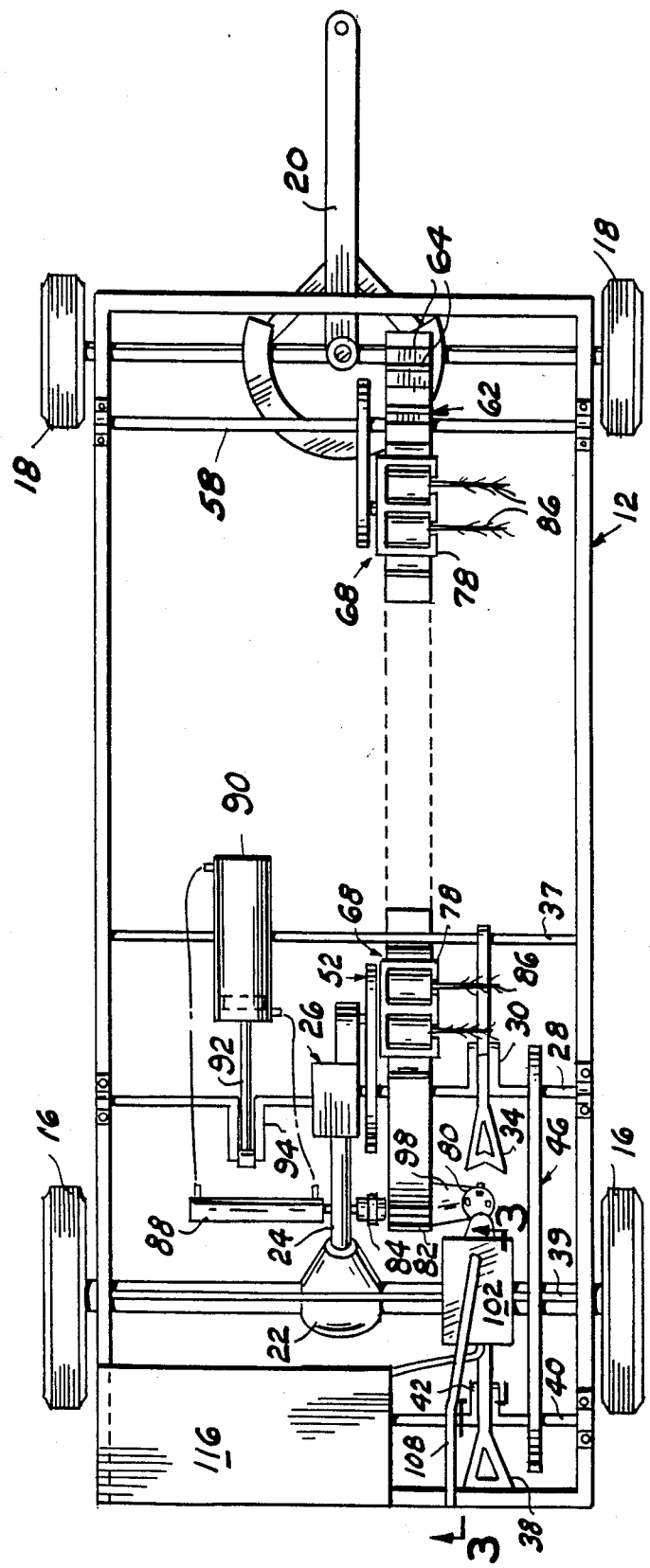
FIG. 2 is a top view of FIG. 1.

Like characters of reference designate like parts in those figures of the drawings in which they occur.

In the drawings:

The first figure indicates the tree planter, as a whole, which is 4-wheel trailer-like in general configuration. The planter 10 comprises a trailer 12 formed by a horizontal rectangular frame 14 having rear wheels 16, front wheels 18 and a tongue 20 to be connected with a prime mover, not shown. The rear wheels 16 are mounted at respective ends of axial housings having a differential 22 medially the wheels which is connected by a drive shaft 24 with gear train means 26 supported upwardly of the axis of the rear wheels substantially in the plane of the trailer frame 14. The transmission means drives a frame journalled plow shaft 28 having a crank portion 30 connected by a link 32 with an intermediate portion of an elongated vertically reciprocating digging implement or plow blade 34 forming a plant receiving recess or furrow 36 in the surface of the earth with each revolution of the shaft 28. The forward end of the plow blade 34 is pivotally supported by a transverse frame shaft 37.

A plant receiving backfilling blade 38 is similarly mounted at its forward end on a horizontal shaft 39 extending transversely of the frame 14 rearwardly of the plow blade 34. A transverse backfill shaft 40 is similarly provided with a crank 42 connected by a link 44 with the backfill blade 38 for vertically reciprocating the blade and backfilling the plant receiving recess 36 in the manner presently explained.

A cog wheel and belt means 46, mounted on the plow shaft 28 and backfilling shaft 40, drives the backfilling shaft 40 in sequence with the furrow forming action, as presently explained.

Conveyor means 48 extends longitudinally of the frame 14 for supplying plants to be planted in sequence with the furrow forming function. The conveyor means comprises a conveyor drive pulley 50 axially mounted on the earth digging shaft 28. The transmission 26 also drives other belt and pulley means 52, to drive a pinion 54 engaging the teeth of the sprocket wheel 50 to rotate the latter counterclockwise, as viewed in FIG. 1.

A companion cog wheel 56 for the wheel 50 is similarly mounted on a transverse shaft 58 at the forward end portion of the trailer. Conveyor belt means 60, such as a cog belt 62 of selected width, is entrained around the cog wheels 50 and 56. The belt 50 is provided with a plurality of rigidly attached paddle-like panels or fins 64 spaced-apart a distance for freely receiving the diametric dimension of plant containers or canisters, as presently explained. The width or distance of the panels 64, projecting beyond the plane of the belt 62, is also substantially equal to the diameter of the plant canisters 66 for the reasons presently apparent.

A plurality of plant reservoirs 68, only two being shown, are mounted above the conveyor belt 62 in juxtaposed relation longitudinally of the trailer. Each of the plant reservoirs comprise a cylindrical drum 70 of selected diameter journalled on a horizontal shaft 72 extending transversely of the conveyor belt 62. The length of the drum 70 is substantially equal to the width of the belt and the periphery of the drum is provided with a plurality, four in the example shown, U-shaped recesses 74 which respectively freely receive and nest one of the plant root surrounding canisters 86. The periphery of each cylinder 70 is surrounded by an arcuate shield 76 which maintains one of the canisters 76 in the respective recess 74. The drums 70 are driven by the belt and pulley means 52 so that as the drums rotate and the conveyor belt 62 moves longitudinally under the drums one of the plant canisters 66 is dropped into each of the empty conveyor recesses formed by respective adjacent panels 64 so that the conveyor belt is continually supplied with plants.

A hopper 78 is mounted above each drum 70 and is formed by an upward extension of the drum shield 76 so that the canisters may fall by gravity into the respective drum recess 74 as it is emptied and presented upwardly toward a plurality of the canisters stacked in the hopper 78.

An open end tree seedling deposit sleeve or chute 80 is supported by the platform below its horizontal plane rearwardly of and in alignment with the plant digging recess blade 34. Spaced above the sleeve-like chute 80 is an arcuate ramp 82 on which the plant canister 66 falls by gravity when released from the conveyor in its progressive path around the rearward cog wheel 50.

Figure 7:
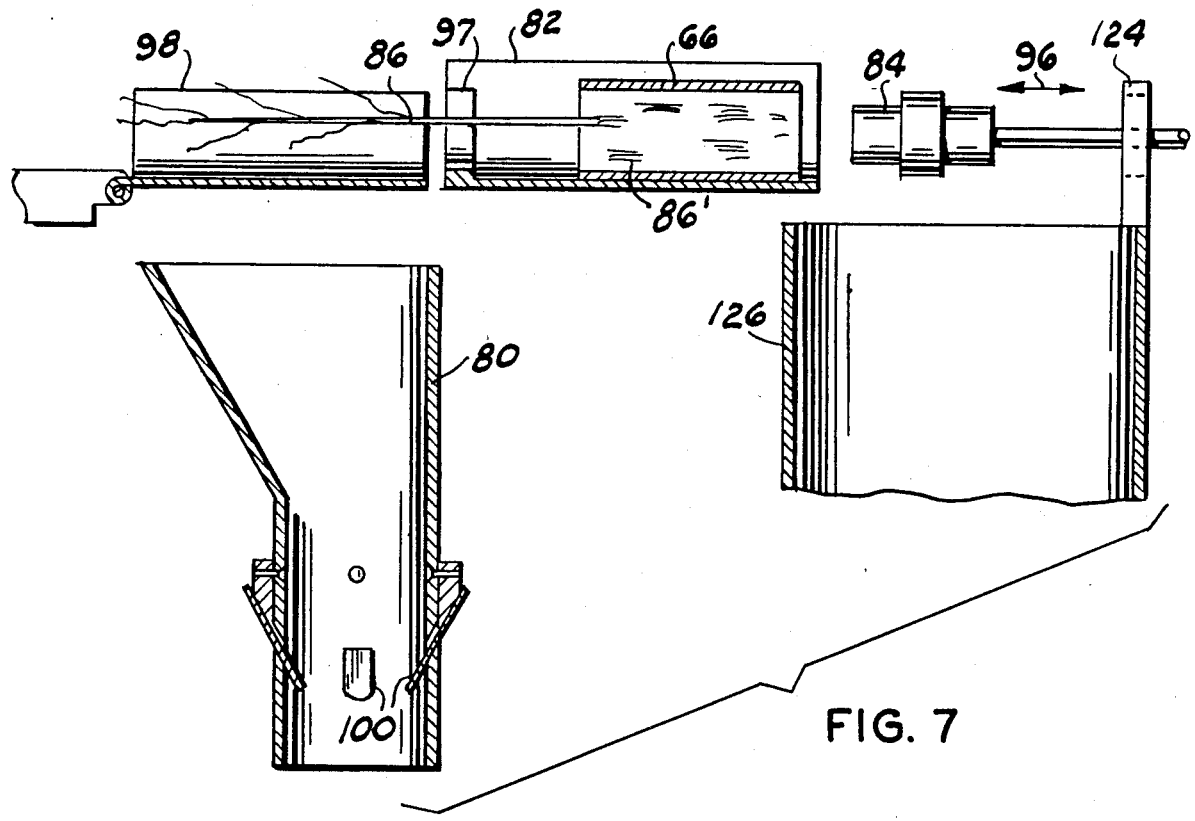
FIG. 7 is a fragmentary cross sectional view, to another scale, illustrating a plant in position to be removed from its container by a plunger.
Figure 8:
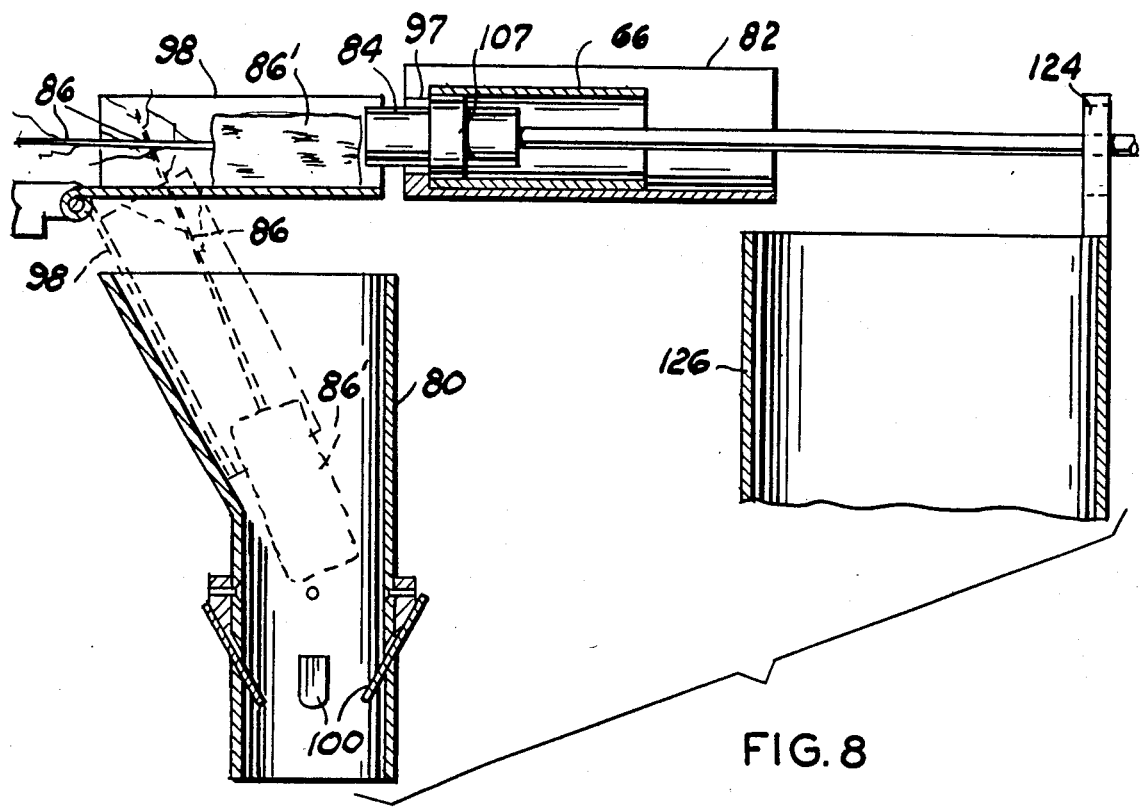
FIG. 8 is a view similar to FIG. 7 illustrating the plant removed from its container and being lowered through a water supply chute toward an earth receiving recess, the plant lowering action being illustrated by dotted lines; and, FIG. 9 illustrates the plunger retracting the empty plant container and depositing it in a receptacle.
Figure 9:
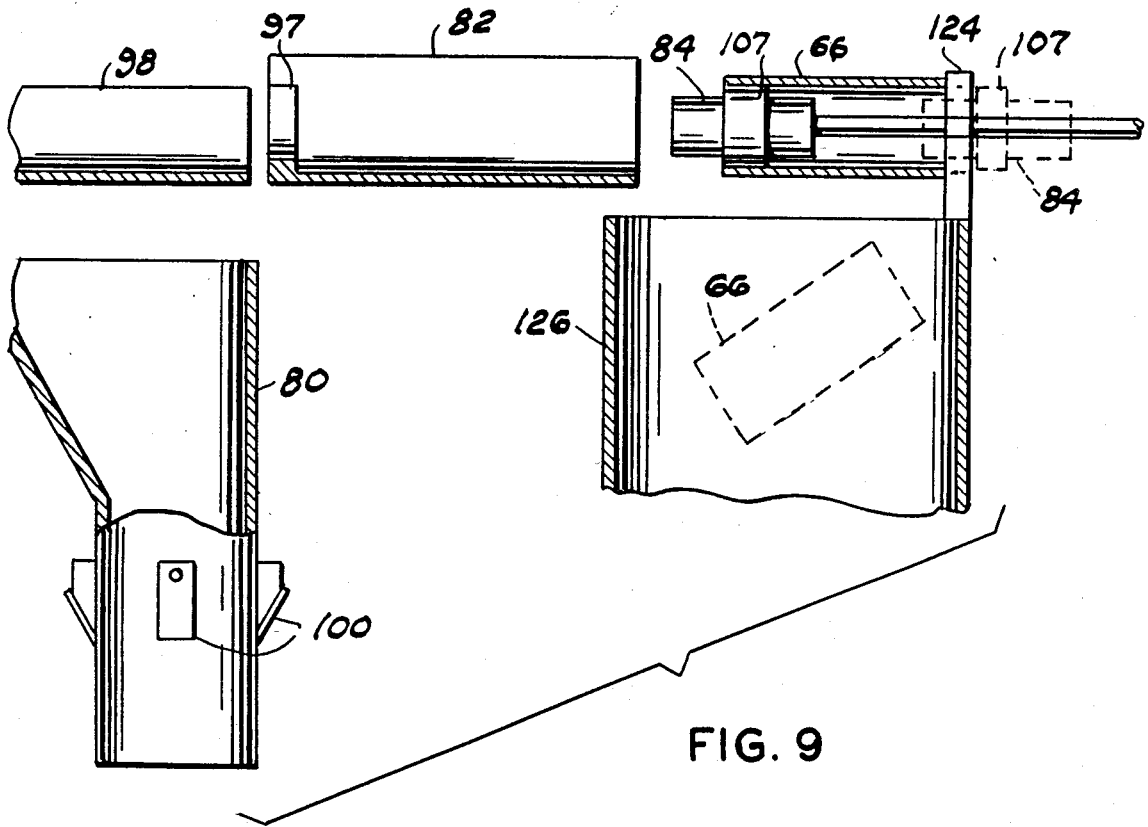

As shown by FIGS. 7, 8 and 9, when the canister 66 lands on the ramp 82, a hydraulic plunger 84, supported in axial alignment with the axis of the canister, acts to separate the plant 86 from the canister, as presently explained.

The plunger 84 is on the end of a piston rod of a hydraulic cylinder 88 supported by the platform and actuated by a double acting power pressure cylinder 90 having its piston rod 92 driven by a crank rod 94 powered by the transmission 26. Hydraulic pressure from the drive cylinder 90 moves the plunger 84 to and fro in the direction of the arrow 96 (FIGS. 7 and 8) to enter the canister 66 forcing the tree seedling root portion 86' out of the canister. The canister is held against axial movement by a U-shaped ring 97 (FIGS. 8 and 9). The seedling 86 is deposited on a hinged shield 98 horizontally disposed above the top end of the chute 80. Gravity tilts the shield 98 and seedling 86 downwardly to the position shown by dotted lines (FIG. 8) so that the root section 86' is caught by a plurality of inwardly directed circumferentially spaced chute fingers 100 to temporarily support the seedling.

A water tank 102, mounted on the trailer platform, is provided with a downspout 104 having its exit end disposed adjacent the top opening of the chute for dumping water thereinto on the seedling 86 to move it downwardly through the chute and into the earth recess 36.

Figure 3:
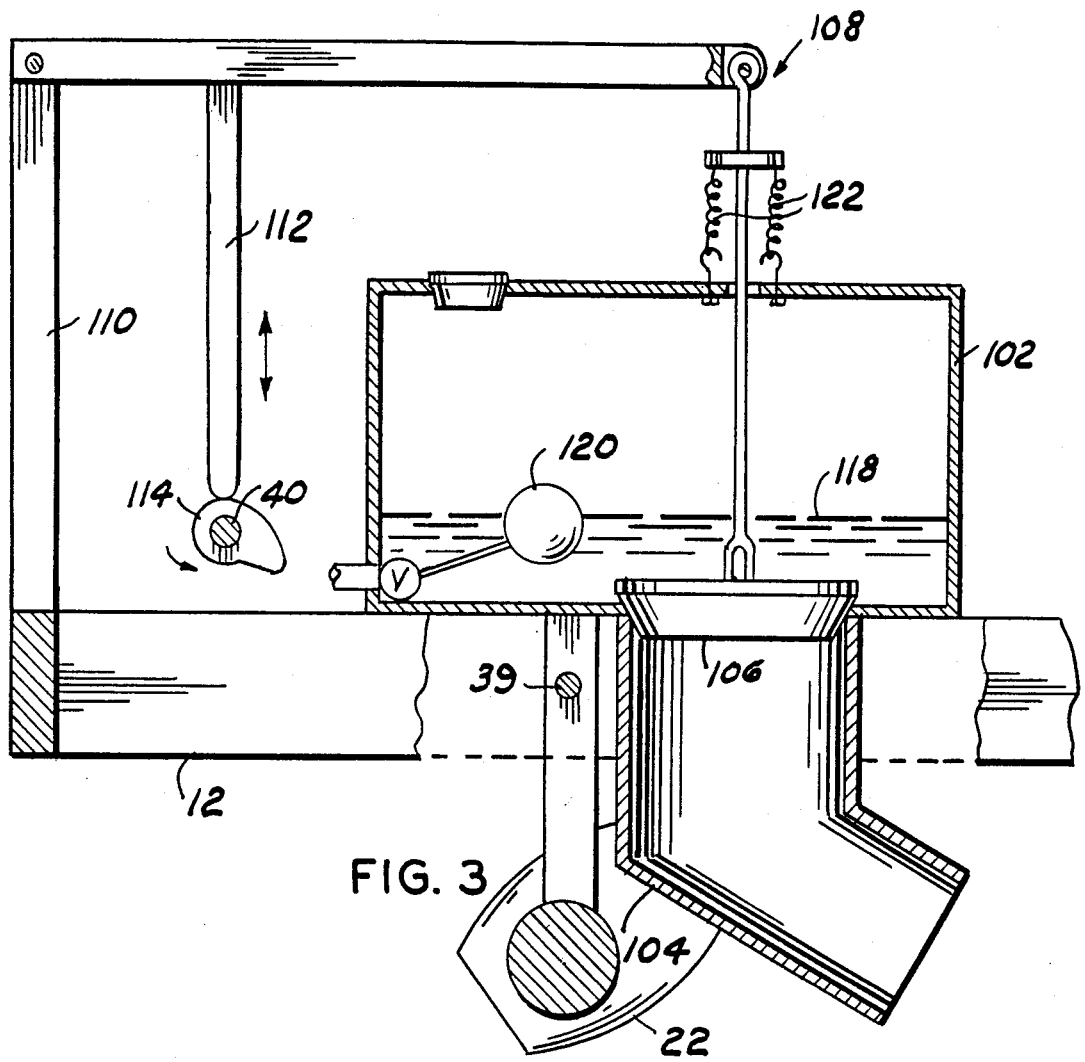
FIG. 3 is a fragmentary vertical cross sectional view, to a larger scale, taken substantially along the line 3—3 of FIG. 2.
Figure 4:
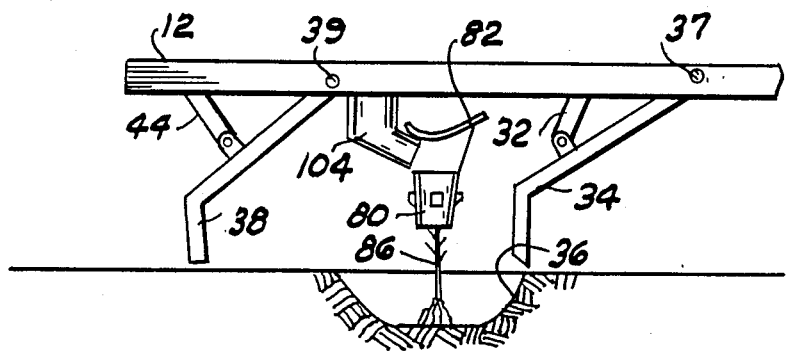
FIG. 4 is a fragmentary side elevational view, to another scale, partially in section, illustrating the earth recess forming and plant depositing function.

As shown by FIG. 3, the water tank is provided with a quick open valve 106 lifted to open the valve by pivoting linkage 108 connecting the valve to a platform mounted standard 110 by a lift stem 112 operated by a cam 114 mounted on the backfill blade drive shaft 40. The tank 102 is connected with a supply reservoir 116 mounted on the platform so that a selected quantity of the water 118 may be maintained in the tank by a float operated valve means 120. Spring means 122 insures a closing action of the valve 106. Simultaneously with this sequence, the power cylinder 90 retracts the plunger 84 off the platform 98 and carries the canister 66 with it by a resilient plunger surrounding ring 107 frictionally contacting the inner periphery of the canister until the canister end encounters a centrally apertured stop or ring 124, through which the plunger 84 passes, so that the plunger is withdrawn from the canister and it falls by gravity into a container 126.

Operation

Assuming the plant hoppers 78 are filled with tree seedlings and the reservoir 116 is filled with water, the device 10 is drawn by a prime mover across soil to be planted with the tree seedlings 86.

The transmission driven digging shaft 28 moves the digging implement 34 downward and upward in response to forward movement of the trailer to form the earth recess 36. Simultaneously, with this action the conveyor means 48 deposits one of the tree seedlings on the platform 82 so that the plunger 84, actuated by the power cylinder 90, positions the seedling root system out of the canister 66 so that the plant falls off the tilting platform 98 into and is supported in the chute 80.

Figure 5:
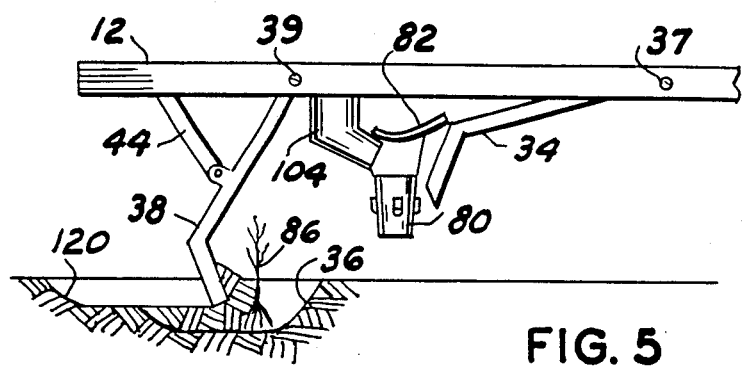
FIG. 5 is a view similar to FIG. 4 illustrating the device moving earth to cover the plant.
Figure 6:
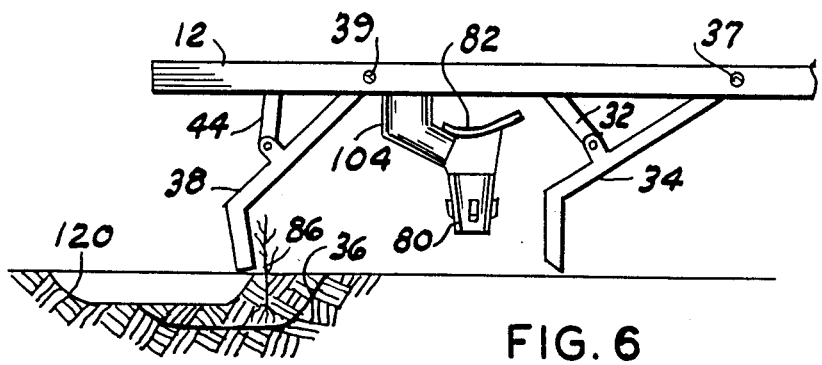
FIG. 6 is a view similar to FIG. 5 illustrating the plant in planted position with a moisture trapping recess formed adjacent the plant.

The cam operated links 108 lift the water valve 106 to dump the water 118 into the chute on top of the plant roots so that it and the plant fall by gravity into the recess 36 during forward movement of the trailer. While this occurs the backfilling blade 38 is descending and engages the earth rearwardly of the recess 36, as indicated at 120 (FIG. 5), to substantially fill the earth recess and cover the plant roots thus leaving the backfill recess 120 adjacent the plant 86 for trapping rain water to nourish the seedling.

As the plant seedlings are imparted from the conveyor belt additional plants fall by gravity into the empty spaces between the panels 64 as the cylinders 70 are rotated.

Obviously, the forwardmost reservoir 78 will be emptied of its plants with the rearwardmost plant reservoir being emptied last.

When the spaces on the conveyor belt are filled, the respective cylinder simply rotates with its contained plants without receiving or deposition additional plants.

Obviously the invention is susceptible to changes or alterations without defeating its practicability. Therefore, we do not wish to be confined to the preferred embodiment shown in the drawings and described herein.

We claim:

1. A tree seedling planting apparatus, comprising:
   trailer means including wheels journalled at respective ends of an axle for horizontally supporting a trailer frame and supplying driving power for frame supported components by forward movement of the trailer means;
   transmission means supported by said frame; a differential on said axle drivably connected with said transmission means;
   elongated plow blade means pivotally supported at one end portion by said frame for vertical pivoting movement of its other end portion;
   a transmission driven first crankshaft transversely journalled by said frame and operatively connected with said blade for vertically reciprocating said other end portion of the latter during forward movement of the trailer means and forming a furrow in the surface of the earth;
   tree seedling conveyor and transfer means for sequentially depositing a tree seedling in the plow blade formed furrow;

an elongated furrow backfill blade pivotally supported at one end portion in spaced relation rearwardly of said plow blade means by said frame for vertical pivoting movement of its other end portion;

a second driven crankshaft transversely journalled by said frame and operatively connected with said backfill blade for backfilling the furrow and covering the root portion of a tree seedling within the furrow in sequence with frame forward movement; and, belt and pulley means drivably connecting said first crankshaft with said second crankshaft.

2. The planting apparatus according to claim 1 in which the conveyor means includes:

a pair of conveyor pulleys journalled by said frame, at least one said conveyor pulley being angularly rotated by said transmission means;

an elongated conveyor belt entrained around said conveyor belt pulleys and having transverse outstanding spaced-apart vanes forming tree seedling canister receiving recesses; and, a generally horizontal ramp disposed at one end of said conveyor belt for supportably receiving a tree seedling falling by gravity off said one end of the conveyor belt.

3. The planting apparatus according to claim 2 in which the seedling transfer means includes:

a pressure cylinder operated elongated plunger having one end axially engaging and moving the root system end portion of a seedling supporting canister deposited on said ramp;

a seedling receiving platform normally horizontally disposed in the path of movement of a seedling moved off said ramp by said plunger, said platform being pivotally supported by said frame for vertical downward pivoting movement by the mass of a seedling deposited thereon; and, a stop on the ramp in axial alignment with the seedling canister for preventing canister movement off the ramp in one direction.

4. The planting apparatus according to claim 3 and further including:

a sleeve chute cooperatively disposed vertically below said seedling platform and in alignment with a path defined by the longitudinal axis of the plant furrow; and, a plurality of circumferentially spaced resilient fingers projecting angularly inward and downwardly through the chute wall for temporarily supporting a tree seedling within the chute.

5. The planting apparatus according to claim 4 and further including:

a water tank supported by said frame adjacent the chute, said tank having a discharge spout emptying into the upper end of said chute;

a valve normally closing the water spout;

cam operated linkage means operatively connected with the valve for opening the latter at predetermined intervals for discharging a predetermined quantity of water into and through the chute for moving a tree seedling therein into an underlying furrow.

6. The planting apparatus according to claim 5 and further including:

at least one hopper cooperatively disposed above said conveyor belt for maintaining the canister recesses filled with tree seedlings.

* * * * *